United States Patent
Walker

(10) Patent No.: US 10,049,296 B2
(45) Date of Patent: Aug. 14, 2018

(54) GRAIN LOSS SENSOR ARRAY FOR CROP HARVESTING MACHINE

(71) Applicant: CNH Industrial America LLC, New Holland, PA (US)

(72) Inventor: Eric L. Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 58 days.

(21) Appl. No.: 15/239,423

(22) Filed: Aug. 17, 2016

(65) Prior Publication Data

US 2018/0053067 A1    Feb. 22, 2018

(51) Int. Cl.
  *G06K 9/46* (2006.01)
  *A01D 41/127* (2006.01)

(52) U.S. Cl.
  CPC ......... *G06K 9/4671* (2013.01); *A01D 41/127* (2013.01); *A01D 41/1273* (2013.01); *G06K 2209/17* (2013.01)

(58) Field of Classification Search
  CPC ............ A01D 41/127; A01D 41/1273; G06K 9/4671; G06K 2209/17; G06T 2207/30188
  See application file for complete search history.

(56) References Cited

U.S. PATENT DOCUMENTS

| | | | |
|---|---|---|---|
| 4,259,829 A | 4/1981 | Strubbe | |
| 6,119,442 A * | 9/2000 | Hale | A01D 41/1277 56/10.2 H |
| 6,421,990 B1 | 7/2002 | Ohlemeyer et al. | |
| 7,372,034 B2 | 5/2008 | Kormann et al. | |
| 8,045,168 B2 | 10/2011 | Missotten et al. | |
| 8,086,378 B2 | 12/2011 | Behnke | |
| 2005/0150202 A1 | 7/2005 | Quick | |
| 2013/0205733 A1* | 8/2013 | Peters | A01D 41/127 56/10.1 |
| 2016/0216245 A1* | 7/2016 | Sutton | G01N 33/0098 |
| 2017/0071125 A1* | 3/2017 | Pfeiffer | A01D 41/1273 |

FOREIGN PATENT DOCUMENTS

| | | |
|---|---|---|
| BR | 200501337 2 A | 12/2005 |
| EP | 1 063 878 B1 | 7/2002 |
| EP | 2586286 A1 | 5/2013 |
| EP | 3038054 A2 | 6/2016 |

OTHER PUBLICATIONS

European Search Report for European Application No. 17185858.2, dated Jan. 24, 2018 (6 pages).

* cited by examiner

*Primary Examiner* — Jon Chang
(74) *Attorney, Agent, or Firm* — Peter K. Zacharias; Patrick M. Sheldrake

(57) ABSTRACT

A grain loss sensor array system is provided for an agricultural harvester. At least one thermal sensing device is attached to a header of the agricultural harvester and captures infrared images or video of the ground. A controller detects pre-harvest loss and harvest loss using the infrared images or video by recognizing a temperature difference or a characteristic thermal difference between the pre-harvest loss, the harvest loss, and the ground. The controller may communicate with or be integrated with a yield monitor to provide information concerning the pre-harvest loss and harvest loss to an operator of the agricultural harvester.

19 Claims, 4 Drawing Sheets

GRAIN LOSS SENSOR ARRAY FOR CROP HARVESTING MACHINE

FIELD OF THE INVENTION

The present invention relates to agricultural harvesters, and, more specifically to sensors for detecting grain loss at the harvesting head of a combine.

BACKGROUND OF THE INVENTION

An agricultural harvester known as a "combine" is historically termed such because it combines multiple harvesting functions within a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent to a vehicle into which the grain is to be unloaded, such as a semi-trailer, gravity box, straight truck, or the like, and an unloading system on the combine is actuated to transfer the grain into the vehicle.

More particularly, a rotary threshing or separating system of a combine includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Meanwhile, incompletely cleaned grain, called tailings, may include incompletely threshed or unthreshed crop, free grains of completely threshed crop, and other plant material or Material Other than Grain (MOG). Such tailings from the upper or lower sieve having fallen onto the tailings auger pan are recycled through the cleaning system. Often, a return auger or tailings conveyance receives the tailings from a tailings auger at the forward end of the auger pan, and lifts the tailings vertically in order to recycle the tailings through the threshing and separating and/or cleaning system.

Harvesting crops using a combine of the above description often results in the loss onto the ground of a certain amount of grain or corn, which is called harvest loss. Harvest loss may be due to incorrect operation of the combine, such as the travel speed being too fast or too slow, or lack of proper optimization of the settings of the header mechanisms, such as the height at which the header is positioned above the ground being too high or too low, as non-limiting examples. Further, the header of the combine may experience a mechanical failure, such as a leak, leading to harvest loss. This harvest loss, coupled with loss onto the ground of grain or corn prior to harvesting due, for example, to insect damage, disease, or weather, called pre-harvest loss, results in significant economic loss to agricultural producers. Currently, there is no automatic method to determine harvest loss that occurs at the header, or to distinguish harvest loss from pre-harvest loss.

As a result, an operator of a combine may proceed to incorrectly operate the combine, fail to optimize the settings of the header mechanisms, or continue to operate the header following a mechanical failure for an extended time, greatly exacerbating overall crop loss. Further, when the operator of the combine makes an adjustment from the cab, he or she does not immediately receive feedback of the positive or negative effect on harvest loss that results from the adjustment. Often, the operator is required to dismount from the combine and conduct a manual investigation on the ground surface to determine the effectiveness of the adjusted settings. Even under this condition, it may be difficult for the operator to distinguish harvest loss from pre-harvest loss. Additionally, attempts by the operator to observe harvest loss from the cab of the combine during operation may distract the operator, resulting in unsafe operation of the combine.

The economic impact of harvest loss, as well as pre-harvest loss, is considerable. At the time of this application, corn sells for approximately $7.00 per bushel. Reasonable harvest losses may be, for example, 3% or one to two bushels per acre. An operator harvesting a hundred acre field, therefore, may leave a thousand dollars' worth of corn on the field under optimal circumstances. Small changes to the position of the header, or in the case of a wheat header to the speed of the rotatable reel, can double or triple grain loss. Undetected, continued incorrect operation of the combine, failure to optimize the settings of the header mechanisms, or continued operation of the header following a mechanical failure, results in thousands of dollars of additional economic losses to the aforementioned operator. Cumulatively, saving only one bushel of crop loss per acre in the United States may add tens of millions of bushels to the grain supply, and may collectively add hundreds of millions of dollars of potential revenue to agricultural producers.

What is needed in the art, therefore, is an automatic system or method to determine harvest loss that occurs at the header, and/or to distinguish harvest loss from pre-harvest loss. What is further needed in the art is an automatic system or method that senses harvest loss and pre-harvest loss, and provides information regarding the type, source, and location of harvest loss and pre-harvest loss, so that the operator of the combine may optimize various settings of the header and combine, such as the height at which the header is maintained above the ground, the travel speed of the combine, and other settings of mechanisms of the header, while receiving useful feedback regarding the effectiveness of the adjustments.

SUMMARY OF THE INVENTION

In accordance with an aspect of the present invention, there is provided an automatic system and method to determine harvest loss that occurs at the header and/or to distinguish harvest loss from pre-harvest loss. Embodiments of the present invention are implemented on a header of an agricultural harvester, and provide a grain loss sensor array system that uses infrared thermal imaging devices, or an array of focused thermal sensors, to detect and recognize grains, kernels, and whole and partial heads of grain or ears of corn. In order to determine the amount and type of harvest loss or pre-harvest loss, the infrared thermal imaging devices or thermal sensors capture and/or record infrared images or video, individually or cumulatively, of the ground over which the header has passed or over which the header is passing. The infrared thermal imaging devices or thermal sensors are connected to a controller that uses software to detect and recognize the grain or corn that has been lost upon the ground by recognizing the thermal characteristics or temperature difference between the grains, corn, stalks and other MOG, and soil from the images or video captured or recorded by the infrared thermal imaging devices, or processed by the controller from data provided by the array of focused thermal sensors.

The software of the controller detects, recognizes, identifies, counts, quantifies, analyzes, and/or categorizes the pre-harvest loss and/or harvest loss. The software may identify whether the detected grain or corn is a single grain, or a connected group of grains or kernels, such as a full or partial head of wheat or ear of corn, which information may be used to help identify pre-harvest loss versus harvest loss. The software of the controller may determine the distribution of the harvest loss, in order to help determine its source, such as from a row unit of a corn header. A yield monitor and/or one or more controllers may be connected to the infrared thermal imaging devices, and may function to detect, recognize, identify, count, quantify, measure, analyze, and/or categorize the pre-harvest loss and/or harvest loss. The yield monitor or other interface may then present this information to the operator of the combine on an instantaneous, cumulative, geographical, and/or field-map basis, which may be visual, numerical, graphical, and/or audible in presentation, so that the operator is informed of the quantity, volume, nature, source, characteristics, and/or distribution of pre-harvest loss and/or harvest loss.

In accordance with another aspect of the present invention, an agricultural harvester having a grain loss sensor array system. At least one thermal sensing device is attached to a header of the agricultural harvester and is configured to capture infrared images or video of the ground. At least one controller is connected to the at least one thermal sensing device. The at least one controller is configured to detect pre-harvest loss and harvest loss using the infrared images or video to recognize a temperature difference or a characteristic thermal difference between the pre-harvest loss or harvest loss and the ground. The at least one controller is configured to further distinguish between the pre-harvest loss and the harvest loss by recognizing a temperature difference or a characteristic thermal difference between the pre-harvest loss and the harvest loss.

In accordance with yet another aspect of the present invention, a grain loss sensor array system of an agricultural harvester. At least one thermal sensing device is attached to a header of the agricultural harvester and is configured to capture infrared images or video of the ground. At least one controller is connected to the at least one thermal sensing device. The at least one controller is configured to detect pre-harvest loss and harvest loss using the infrared images or video to recognize a temperature difference or a characteristic thermal difference between the pre-harvest loss or harvest loss and the ground. The at least one controller is configured to further distinguish between the pre-harvest loss and the harvest loss by recognizing a temperature difference or a characteristic thermal difference between the pre-harvest loss and the harvest loss.

In accordance with still another aspect of the present invention, a method of sensing pre-harvest loss and/or harvest loss. The method includes several steps. The first step is capturing infrared images or video of the ground using at least one infrared thermal imaging device attached to a header of an agricultural harvester. The next step is detecting pre-harvest loss and harvest loss using at least one controller connected to the at least one infrared thermal imaging device to recognize in the captured infrared images or video a temperature difference or a characteristic thermal difference between the pre-harvest loss or harvest loss and the ground. The last step is further distinguishing between the pre-harvest loss and the harvest loss using the at least one controller to recognize in the captured infrared images or video a temperature difference or a characteristic thermal difference between the pre-harvest loss and the harvest loss.

The amount of harvest loss that occurs in particular may be effected by various settings of the header and combine, such as the height at which the header is maintained above the ground, the travel speed of the combine, cutter bar and rotatable reel speed settings (in the case of a wheat header), and other settings of mechanisms of the header, as non-limiting examples. An advantage is that it allows an operator to make informed and potentially real-time adjustments to these settings, while receiving feedback on the results, thereby avoiding unnecessary and expensive crop loss. Another advantage is that the grain loss sensor array system may be added to an existing header and combine or current header and combine design without significant changes to the structure or design of the header or combine. Further, the grain loss sensor array system may be added to any brand of equipment, and may be integrated with existing yield monitoring systems. By attaching the infrared thermal imaging devices to the header close to the point of harvest loss, the grain loss sensor array system is able to detect, recognize, and analyze the pre-harvest loss and harvest loss when the identifiable temperature or thermal characteristics are most pronounced, thereby improving accuracy.

By providing pre-harvest loss and harvest loss information on a geographic or field mapped basis, the grain loss sensor array system assists the customer in determining areas that correlate to higher crop losses, as well as allowing the customer to optimize crop varieties, treatments, and harvesting methods to appropriate fields.

Additional features and advantages of the invention will be made apparent from the following detailed description of illustrative embodiments that proceeds with reference to the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material that is threshed and separated from the discardable part of the crop material, which is referred to as non-grain crop material, MOG or straw. Incompletely threshed crop material, which may include unthreshed crop, free grains of completely threshed crop, and other Material Other than Grain (MOG), is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "grains," "kernels," and "beans" are used interchangeably to refer to individual crop elements, whereas "heads of wheat" or "ears of corn" are used interchangeably to refer to groups or clusters of crop elements.

Figure 1:
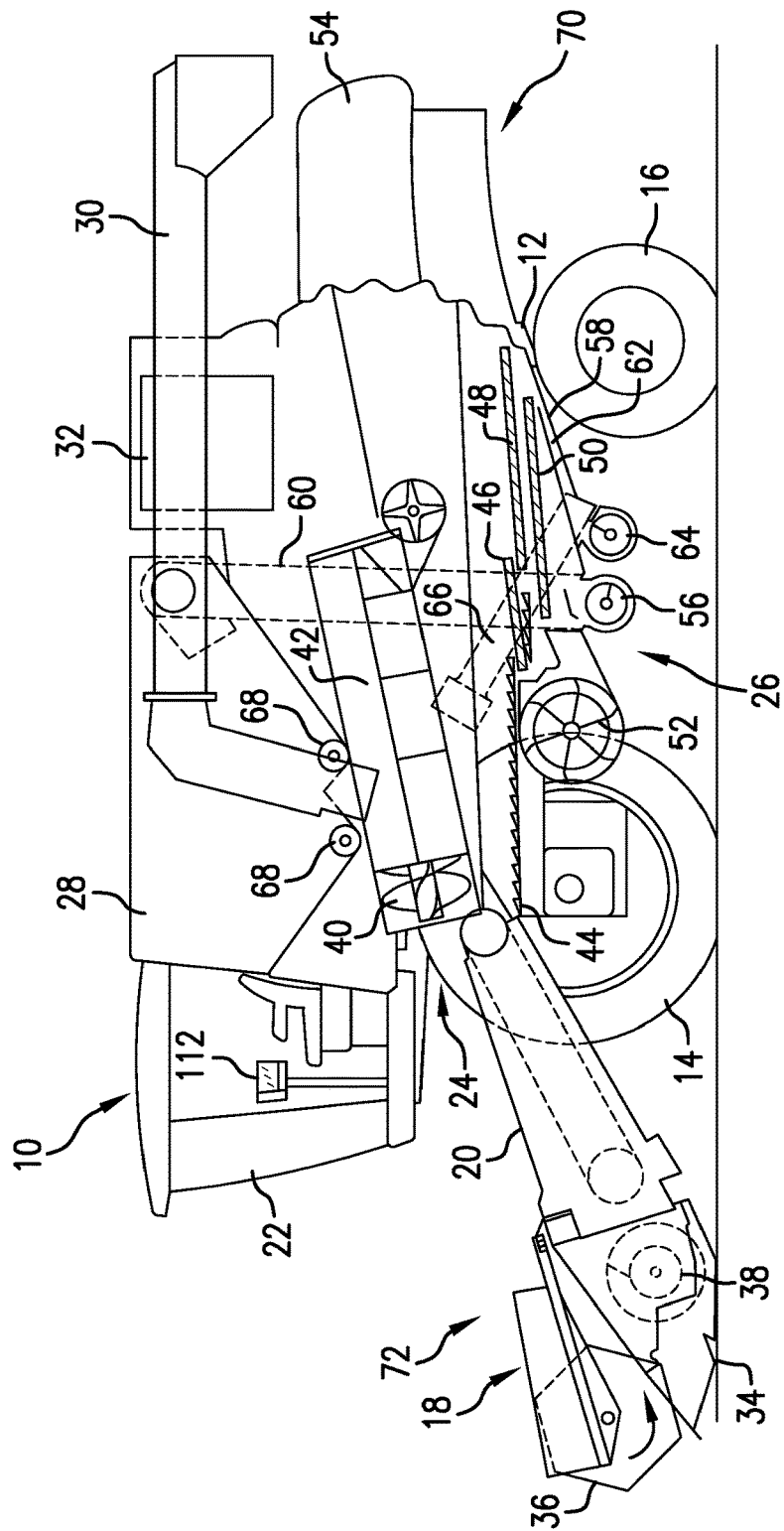
FIG. 1 is a side view of an agricultural harvester in the form of a combine, in accordance with an exemplary embodiment of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30, in accordance with an exemplary embodiment of the present invention. The header 18 connected to the feeder housing 20 on the combine 10 shown in FIG. 1 is illustrated as a wheat header 72. Unloading conveyor 30 is illustrated as an unloading auger, but can also be configured as a belt conveyor, chain elevator, etc. The front wheels 14 are larger flotation type wheels, and rear wheels 16 are smaller steerable wheels. Motive force is selectively applied to the front wheels 14 through a power plant in the form of a diesel engine 32 and a transmission (not shown).

Although the combine 10 is shown as including wheels, is also to be understood that the combine 10 may include tracks, such as full tracks or half-tracks. The header 18 configured as a wheat header 72 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24, and may be selectively vertically movable using appropriate actuators, such as hydraulic cylinders (not shown).

The threshing and separating system 24 is illustrated as being of the axial-flow type, and generally includes a rotor 40 at least partially enclosed by and rotatable within a corresponding perforated concave 42. The cut crops are threshed and separated by the rotation of the rotor 40 within the concave 42, and larger elements of MOG, such as stalks, leaves and the like are discharged from the rear of the combine 10. Smaller elements of crop material including grain and non-grain crop material, including particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves to remove MOG, residue, chaff, and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger pan 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10. A residue handling system 70 integrated in the rear of the harvester 10 receives airborne MOG, residue, and chaff from the threshing and separating system 24 and from the cleaning system 26.

A yield monitor 112 may be provided in the operator cab 22 in order to provide the operator with information regarding the crop being harvested, field conditions, and other information pertinent to the operation of the combine 10.

Figure 2:
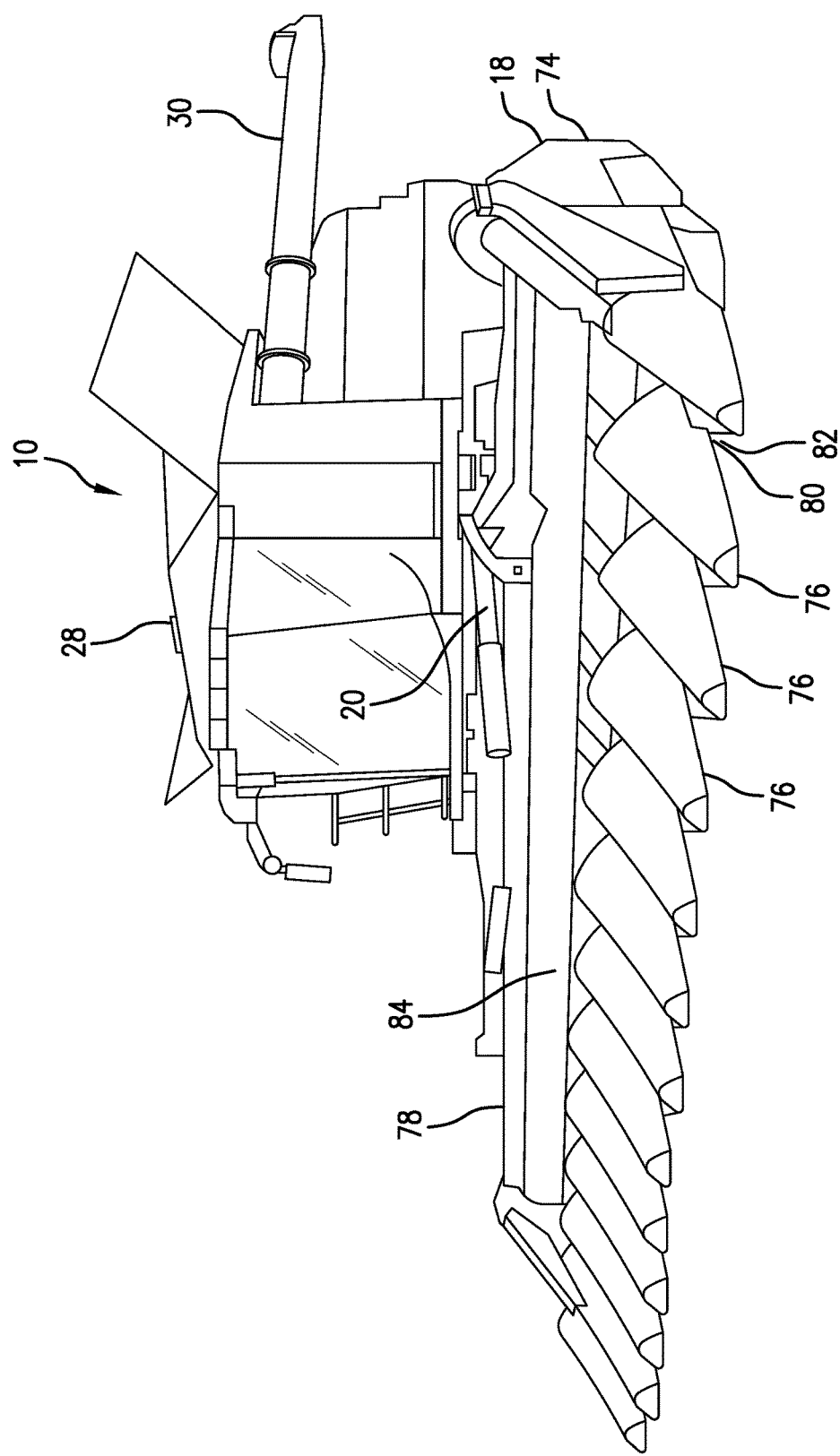
FIG. 2 is an isometric view of an agricultural harvester in the form of a combine, in accordance with an exemplary embodiment of the present invention.

FIG. 2 shows another agricultural harvester in the form of a combine 10, again having a header 18 and a feeder housing 20 leading to a threshing and separating system 24 (not shown) and a cleaning system 26 (not shown), in accordance with an exemplary embodiment of the present invention. The combine 10 again has a grain tank 28 and an unloading conveyance 30. The header 18 connected to the feeder housing 20 on the combine 10 shown in FIG. 2 is illustrated as a corn header 74. Several row units 76 are attached to the front of the corn header 74 that serve to guide cornstalks into the corn header 74 for processing. Gathering chains 80 (not visible) between the row units 76 cooperate with stalk knife rolls 82 (also not visible) to sever the cornstalks and pull them down between the row units 76. One or more conveyances such as an auger 84 draw the cornstalks towards the center of the corn header 74 beneath a hood 78, so that they may be drawn into the feeder housing 20.

Figure 3:
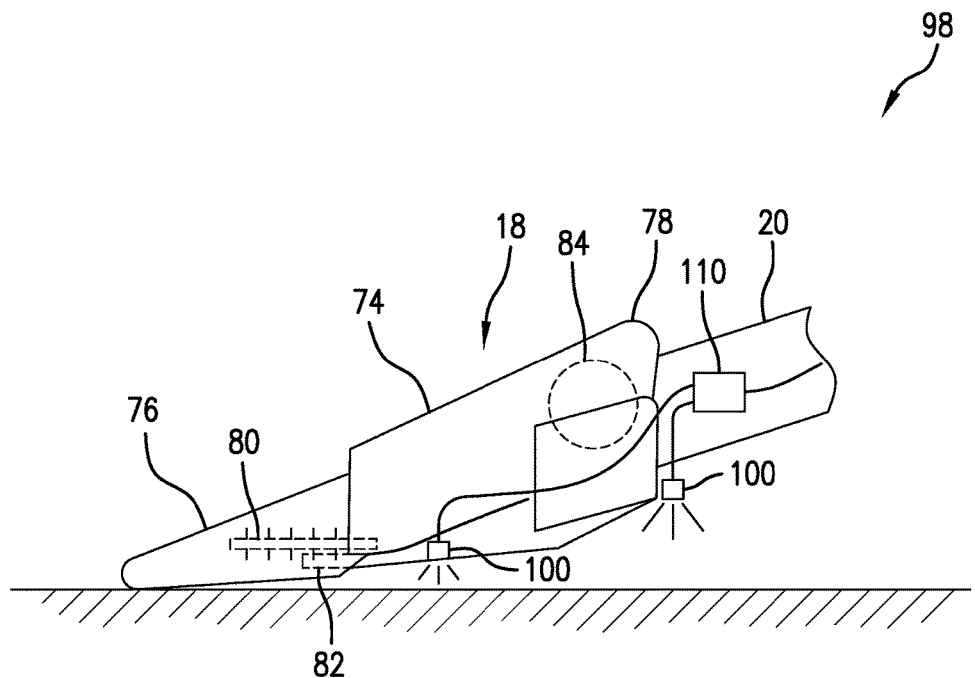
FIG. 3 is a side view of a header of a combine having a grain loss sensor array system according to an exemplary embodiment of the invention.

Turning now to FIG. 3, a grain loss sensor array system 98 according to an exemplary embodiment of the present invention is shown. A header 18 of a combine 10 (not shown) is connected to a feeder housing 20, the feeder housing 20 being shown in partial view. The header 18 is again illustrated as a corn header 74 having row units 76. Gathering chains 80 are located between the row units 76, and again cooperate with stalk knife rolls 82 to sever cornstalks and pull them down between the row units 76. One or more conveyances such as auger 84 again draw the cornstalks towards the center of the corn header 74 beneath a hood 78, so that they may be drawn into the feeder housing 20. At least one infrared thermal imaging device 100 is attached to the header 18, and functions to sense pre-harvest and/or harvest grain loss, as will be shown in further detail. The at least one infrared thermal imaging device 100 may be attached underneath the header 18, or may be attached to the rear side of the header 18.

Figure 4:
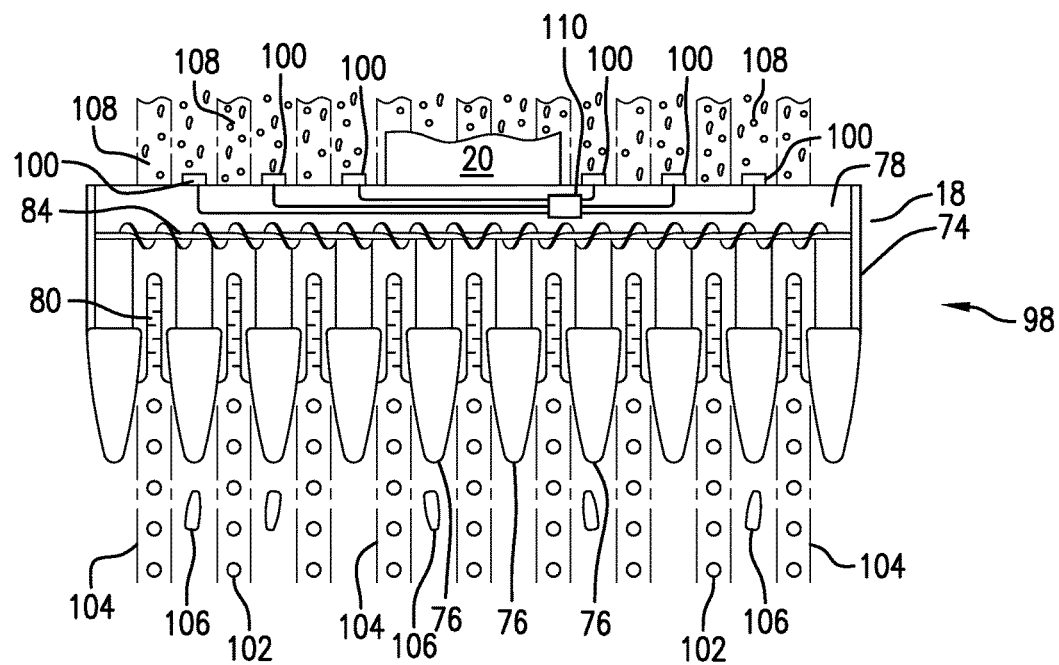
FIG. 4 is a top view of a header of a combine having a grain loss sensor array system according to an exemplary embodiment of the invention.

Turning now to FIG. 4, a grain loss sensor array system 98 according to an exemplary embodiment of the present invention is again shown. A header 18 in the form of a corn header 74 is again connected to a feeder housing 20 of a combine 10 (not shown), the feeder housing 20 being shown in a partial view. Gathering chains 80 and stalk knife rolls 82 (not visible) again sever and draw cornstalks 102 in between row units 76. One or more conveyances such as an auger 84 again draw the cornstalks 102 towards the center of the corn header 74 beneath a hood 78, so that the cornstalks 102 may be drawn into the feeder housing 20. The grain loss sensor array system 98 according to the embodiment of the invention shown in FIG. 4 provides the corn header 74 with at least one infrared thermal imaging device 100, shown as multiple such infrared thermal imaging devices 100 attached to the corn header 74 along its back side at incremental spacing. The infrared thermal imaging devices 100 may be spaced so that there are fewer than one infrared thermal imaging device 100 per corn row 104, or may be spaced so that there are one (or more) infrared thermal imaging devices 100 per corn row. Alternately, the infrared thermal imaging devices 100 may be attached to the corn header 74 along its underside, as shown in FIG. 3.

As the combine 10 moves through the field and the corn header 74 gathers the crop material into the combine 10, it passes over pre-harvest loss 106, which consists of grain or corn that has fallen to the ground before it can be harvested. This may be due to insect damage, disease, or weather, as non-limiting examples. In the process of the crop passing between the row units 76, engaging the gathering chains 80 and stalk knife rolls 82, and being drawn into the feeder housing 20 by the conveyances such as auger 84 within the hood 78, further grain or corn may be lost onto the ground. The grain or corn that is lost in this way is called harvest loss 108. Note that the header 18 is illustrated as a corn header 74, although the same principle of harvest loss 108 applies to wheat headers 72, or to any other harvesting machine or apparatus. The amount of harvest loss 108 that occurs may be effected by various settings of the header 18 and combine 10, such as the height at which the header 18 is maintained above the ground, the travel speed of the combine 10, cutter bar 34 and rotatable reel 36 speed settings (in the case of a wheat header 72), and other settings of mechanisms of the header 18, as non-limiting examples.

In order to determine the amount and type of harvest loss 108 or pre-harvest loss 106, infrared thermal imaging devices 100 of the grain loss sensor array system 98 capture and/or record infrared images or video of the ground over which the header 18 has passed or over which the header 18 is passing. Grains, corn, stalks and other MOG, and soil each absorb and lose heat throughout the day at different rates due to different emissivity and absorptivity characteristics, as well as due to different moisture content. Further, grain or corn that has just been lost to the ground as harvest loss 108 may have different temperature or thermal characteristics than grain or corn that has been lost to pre-harvest loss 106, and therefore has been on the ground for a longer period of time. The infrared thermal imaging devices 100 are connected to or incorporate at least one controller 110 that uses software that detects and recognizes grains or corn that have been lost upon the ground by recognizing the thermal characteristics or temperature difference between the grains, corn, stalks and other MOG, and soil from the images or video captured and/or recorded by the infrared thermal imaging devices 100. Temperature may be determined, as a non-limiting example, by the infrared signature of the grain, corn, stalks, or soil. Thermal characteristics may be determined, as a non-limiting example, by the rate of change of the infrared signature of the grain, corn, stalks, or corn.

The software of the at least one controller 110, coupled with the at least one infrared thermal imaging device 100 detects, recognizes, identifies, counts, quantifies, analyzes, and/or categorizes the pre-harvest loss 106 and harvest loss 108 grain or corn, at least partly on the basis of the temperature differences and thermal characteristics of the grains, kernels, heads of wheat, or ears of corn. Additionally, the software of the at least one controller 110 identifies whether the detected grain or corn is a single grain, or a connected group of grains or kernels, such as a full or partial head of wheat or ear of corn. Pre-harvest loss 106 is more likely to be in the form of full heads of wheat or full ears of corn, having a large surface area when sorted by size. Additionally, pre-harvest loss 106 may have a different moisture content due to a longer period of ground contact, and therefore identifiable temperature or thermal characteristics resulting therefrom. This pre-harvest loss 106 is therefore identified, counted, quantified, analyzed, and/or categorized by the software of the at least one controller 110 connected to the at least one infrared thermal imaging device 100, according to the identifiable temperature or thermal characteristics, and/or according to whether the detected and recognized grain or corn is a connected group of kernels, such as a full head of wheat or ear of corn.

Harvest loss 108 due to the row units 76, gathering chains 80, or stalk knife rolls 82 typically results in grain or corn landing on the ground within three inches of the stalks, or nominally within a six inch strip centered on the cornrow 104. Harvest loss 108 coming from the hood 78 or the one or more conveyances such as auger 84 of the header 18 tends to be more homogeneously distributed over the ground surface across the width, or a portion of the width, of the header 18. Harvest loss 108 also is more likely to be in the form of individual grains of wheat or kernels of corn, or fragments of heads of wheat or fragments of ears of corn. Additionally, harvest loss 108 has identifiable temperature or thermal characteristics due to its previous vertical elevation on the stalk and exposure to airflow, due to being recently detached from the plant, and due to contact with the header 18. Harvest loss 108 is therefore identified, counted, quantified, analyzed, and/or categorized by the software of the at least one controller 110 connected to the at least one infrared thermal imaging device 100, according to its identifiable temperature or thermal characteristics, according to whether the detected and recognized grain or corn is individual grains of wheat or kernels of corn, or a partial or fragmented head of wheat or ear of corn, and according to its distribution on the field. For example, the harvest loss 108 may be characterized by the software as being within the six inch strip centered on the cornrow 104, and therefore attributable to the row units 76, gathering chains 80, or stalk knife rolls 82, or as being homogeneously distributed over the ground surface across the width, or a portion of the width, of the header 18, and therefore attributable to the hood 78 or the one or more conveyances such as the auger 84 of the header 18.

By attaching the at least one infrared thermal imaging device 100 to the corn header 74 along its back side at incremental spacing, or to the underside of the corn header 74 at incremental spacing, the at least one infrared thermal imaging device 100 of the grain loss sensor array system 98 is closer to the point of harvest loss 108 of the grains, kernels of corn, heads of grain, or ears of corn. In this way, the at least one infrared thermal imaging device 100 is able to detect, recognize, and analyze the grains, kernels of corn, heads of grain, or ears of corn when the identifiable temperature or thermal characteristics are most pronounced. In other words, the grains, kernels of corn, heads of grain, or ears of corn that were lost by the header 18, being harvest loss 108, are sensed immediately after making contact with the ground before they have had time to reach temperature or thermal equilibrium with those that have been on the ground for a longer period of time, being pre-harvest loss 106.

The software of the at least one controller 110, coupled with the at least one infrared thermal imaging device 100, having detected, recognized, identified, counted, quantified analyzed, and/or categorized the pre-harvest loss 106 and harvest loss 108 grain or corn, may cooperate with, or may be integrated with, a yield monitor such as the yield monitor 112 shown in FIG. 1. Alternately, the yield monitor 112 may function in place of the at least one controller 110, so that the software of the yield monitor 112, coupled with the at least one infrared thermal imaging device 100, may detect, recognize, identify, count, quantify, analyze, and/or categorize the pre-harvest loss 106 and harvest loss 108 grain or corn.

In either case, the yield monitor may then present this information to the operator of the combine 10 on an instantaneous basis, which may be visual, numerical, graphical, or audible in presentation, so that the operator is informed of the quantity, nature, and source of pre-harvest loss 106 and/or harvest loss 108. As a non-limiting example, the yield monitor may graphically present on an instantaneous basis to the operator of the combine 10 information indicating that harvest loss 108 is occurring, and that it is coming from one or more of the row units 76, gathering chains 80, or stalk knife rolls 82. In this way, the operator of the combine 10 can make changes to various settings of the header 18 and combine 10, such as the header height, the travel speed of the combine 10, and/or other settings of mechanisms of the header 18 or of the combine 10, or effect repairs thereto, in order to reduce or minimize harvest loss 108. Feedback on the effect of such changes is thereby made convenient and nearly instantaneous, so that the harvest may be maximized and harvest loss 108 minimized.

Further, the yield monitor may present this information to the operator of the combine 10 on a cumulative, geographical or field-map basis, which may be visual, numerical, or graphical in presentation. Specifically, the software may provide geographical or field-map correlated information regarding pre-harvest loss 106 and harvest loss 108, such as loss volume and source for each, so that the information may be used to identify the cause of location specific pre-harvest loss 106 and harvest loss 108. As a non-limiting example, due to soil conditions, crop plants may grow taller and fuller in one area of the field than in another, such that present and future settings of the header 18 and combine 10 may be optimized to minimize losses according to the needs of the crop in that area of the field. As another example, pre-harvest loss 106 may be identified as being particularly high in a region of the field, which may lead to changes in future crop treatment in that area. The yield monitor may therefore record pre-harvest loss 106 and harvest loss 108 count, quantity, volume, type, source, characteristics, and/or distribution in geographical or field-map correlated format, so that maps may be created using this information for present or future use by the operator. Further, this information may be used to calibrate the at least one infrared thermal imaging device 100 and the software of the at least one controller 110 or yield monitor 112, against empirical data.

Note that the grain loss sensor array system 98 of the present invention can be applied to combines 10 using wheat headers 72 or corn headers 74 as illustrated in FIGS. 1 through 4, as well as to other types of harvesting headers and machines, such as soybean headers, bean harvesters, coffee bean harvesters, grape harvesters, forage harvesters, and etcetera. Additionally, although the grain loss sensor array system 98 of the present invention is disclosed herein as utilizing infrared thermal imaging devices 100 to capture and/or record infrared images or video, which is used by the software of the controller 110 and/or yield monitor 112 to determine pre-harvest loss 106 and/or harvest loss 108, it is contemplated that another type of sensor may be used to recognize thermal or temperature differences between the grains, corn, stalks and other MOG, and soil, in order to so determine pre-harvest loss 106 and/or harvest loss 108. The infrared thermal imaging devices 100 may be infrared cameras taking infrared photographs or videos.

Alternately, the infrared thermal imaging devices 100 may be a tightly packed array of thermal sensors in a linear arrangement along the length of the header 18, each thermal sensor being unidirectional and able to make thermal measurements of a small, focused area. In this way, thermal or temperature differences between the grains, corn, stalks and other MOG, and soil may be determined on the basis of data accumulated by the array of thermal sensors cumulatively, which data provided by the array of thermal sensors may be processed by the software of the at least one controller 110 to form an overall image or video. It is noted that the infrared thermal imaging devices 100 described herein are advantageously resistant to plant sap and other types of contamination.

Figure 5:
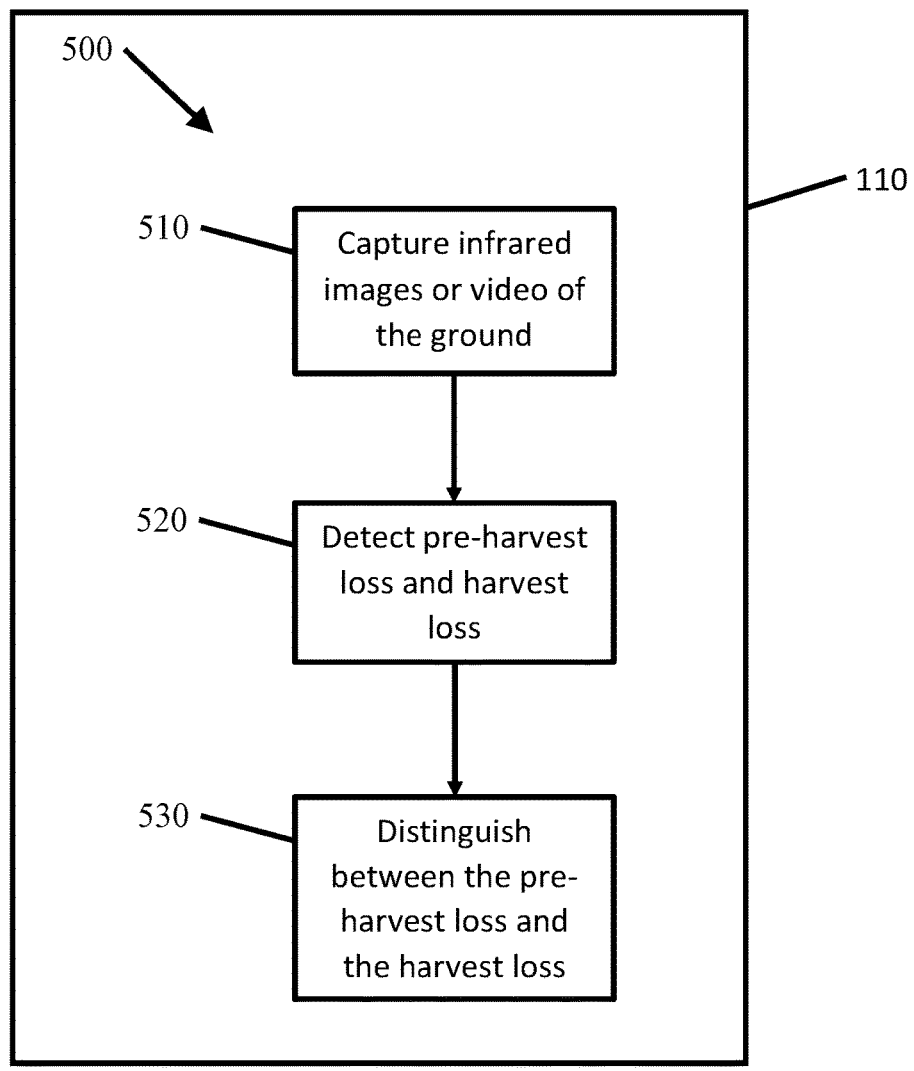
FIG. 5 is a flow chart showing the series of steps taken in the functioning of an embodiment of the invention.

Referring now to FIG. 5, there is illustrated a method, generally designated as 500, of sensing pre-harvest loss and/or harvest loss. The method 500 comprises Steps 510 through 530. The first step 510 is capturing infrared images or video of the ground using at least one infrared thermal imaging device attached to a header of an agricultural harvester. The next step 520 is detecting pre-harvest loss and harvest loss using at least one controller connected to the at least one infrared thermal imaging device to recognize in the captured infrared images or video a temperature difference or a characteristic thermal difference between the pre-harvest loss or harvest loss and the ground. The last step 530 is further distinguishing between the pre-harvest loss and the harvest loss using the at least one controller to recognize in the captured infrared images or video a temperature difference or a characteristic thermal difference between the pre-harvest loss and the harvest loss.

It is to be understood that the steps of the method 500 are performed by the controller 110 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 110 described herein, such as the method 500, is implemented in software code or instructions which are tangibly stored on a tangible computer readable medium. Upon loading and executing such software code or instructions by the controller 110, the controller 110 may perform any of the functionality of the controller 110 described herein, including any steps of the method 500 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester having a grain loss sensor array system, comprising:
    at least one thermal sensing device attached to a header of the agricultural harvester and configured to capture infrared images or video of the ground; and
    at least one controller being connected to said at least one thermal sensing device,
    wherein said at least one controller is configured to detect pre-harvest loss and harvest loss by using said infrared images or video to recognize at least one of a temperature difference and a characteristic thermal difference between said pre-harvest loss and said harvest loss, and the ground, and
    wherein said at least one controller is configured to distinguish between pre-harvest loss and harvest loss by recognizing at least one of a temperature difference and a characteristic thermal difference between said pre-harvest loss and said harvest loss.

2. The agricultural harvester of claim 1, wherein:
    said at least one controller being further configured to distinguish between pre-harvest loss and harvest loss by recognizing single crop elements, partial connected clusters of crop elements, and full connected clusters of crop elements.

3. The agricultural harvester of claim 1, wherein:
    said at least one controller being further configured to distinguish between harvest loss originating from at least one row unit or row unit mechanism of said header and harvest loss originating from a hood or conveyance of said header by recognizing a distribution of said harvest loss.

4. The agricultural harvester of claim 1, wherein:
    said at least one thermal sensing device further being at least one infrared thermal imaging device.

5. The agricultural harvester of claim 1, wherein:
    said at least one thermal sensing device further being an array of thermal sensors in a linear arrangement along said header, each said thermal sensor configured to measure at least one of a temperature and thermal characteristic of a focused area of the ground and to provide data to said at least one controller; and
    said at least one controller being configured to process said data into infrared images or video captured cumulatively by said array of thermal sensors.

6. The agricultural harvester of claim 1, wherein:
    said at least one controller being one of connected to and integrated with a yield monitor.

7. The agricultural harvester of claim 6, wherein said yield monitor is configured to provide at least one of instantaneous information and cumulative information, including an indication of at least one of a count, quantity, volume, type, category, characteristic, source, location, and distribution of at least one of said pre-harvest loss and said harvest loss, to an operator of the agricultural harvester.

8. The agricultural harvester of claim 1, wherein:
    said at least one thermal sensing device being attached to at least one of a backside and an underside of said header.

9. A grain loss sensor array system of an agricultural harvester, comprising:
    at least one thermal sensing device attached to a header of the agricultural harvester and configured to capture infrared images or video of the ground; and at least one controller being connected to said at least one thermal sensing device, wherein said at least one controller is configured to detect pre-harvest loss and harvest loss by using said infrared images or video to recognize at least one of a temperature difference and a characteristic thermal difference between said pre-harvest loss and said harvest loss, and the ground, and wherein said at least one controller is configured to distinguish between pre-harvest loss and harvest loss by recognizing at least one of a temperature difference and a characteristic thermal difference between said pre-harvest loss and said harvest loss.

10. The grain loss sensor array system of claim 9, wherein:

said at least one controller being further configured to distinguish between pre-harvest loss and harvest loss by recognizing single crop elements, partial connected clusters of crop elements, and full connected clusters of crop elements.

11. The grain loss sensor array system of claim 9, wherein:

said at least one controller being further configured to distinguish between harvest loss originating from at least one row unit or row unit mechanism of said header and harvest loss originating from a hood or conveyance of said header by recognizing a distribution of said harvest loss.

12. The grain loss sensor array system of claim 9, wherein:

said at least one thermal sensing device further being at least one infrared thermal imaging device.

13. The grain loss sensor array system of claim 9, wherein:

said at least one thermal sensing device further being an array of thermal sensors in a linear arrangement along said header, each said thermal sensor configured to measure at least one of a temperature and a thermal characteristic of a focused area of the ground and to provide data to said at least one controller; and said at least one controller being configured to process said data into said infrared images or video captured cumulatively by said array of thermal sensors.

14. The grain loss sensor array system of claim 9, wherein:

said at least one controller being one of connected to and integrated with a yield monitor.

15. The grain loss sensor array system of claim 14, wherein said yield monitor is configured to provide at least one of instantaneous information and cumulative information, including an indication of at least one of a count, quantity, volume, type, category, characteristic, source, location, and distribution of at least one of said pre-harvest loss and said harvest loss, to an operator of the agricultural harvester.

16. The grain loss sensor array system of claim 9, wherein:

said at least one thermal sensing device being attached to at least one of a backside and an underside of said header.

17. A method of sensing at least one of pre-harvest loss and harvest loss, comprising the steps of:

capturing infrared images or video of the ground using at least one infrared thermal imaging device attached to a header of an agricultural harvester;

detecting pre-harvest loss and harvest loss using at least one controller connected to said at least one infrared thermal imaging device to recognize in said captured infrared images or video at least one of a temperature difference and a characteristic thermal difference between the pre-harvest loss or harvest loss and the ground; and distinguishing between the pre-harvest loss and the harvest loss using said at least one controller to recognize in said captured infrared images or video at least one of a temperature difference and a characteristic thermal difference between the pre-harvest loss and the harvest loss.

18. The method of claim 17, further comprising the step of:

further distinguishing between the pre-harvest loss and the harvest loss using said at least one controller to recognize in said captured infrared images or video single crop elements, partial connected clusters of crop elements, and full connected clusters of crop elements.

19. The method of claim 17, further comprising the step of:

further distinguishing between harvest loss originating from at least one row unit or row unit mechanism of said header and harvest loss originating from a hood or conveyance of said header using said at least one controller to recognize in said captured infrared images or video a distribution of said harvest loss.

* * * * *